UNITED STATES PATENT OFFICE.

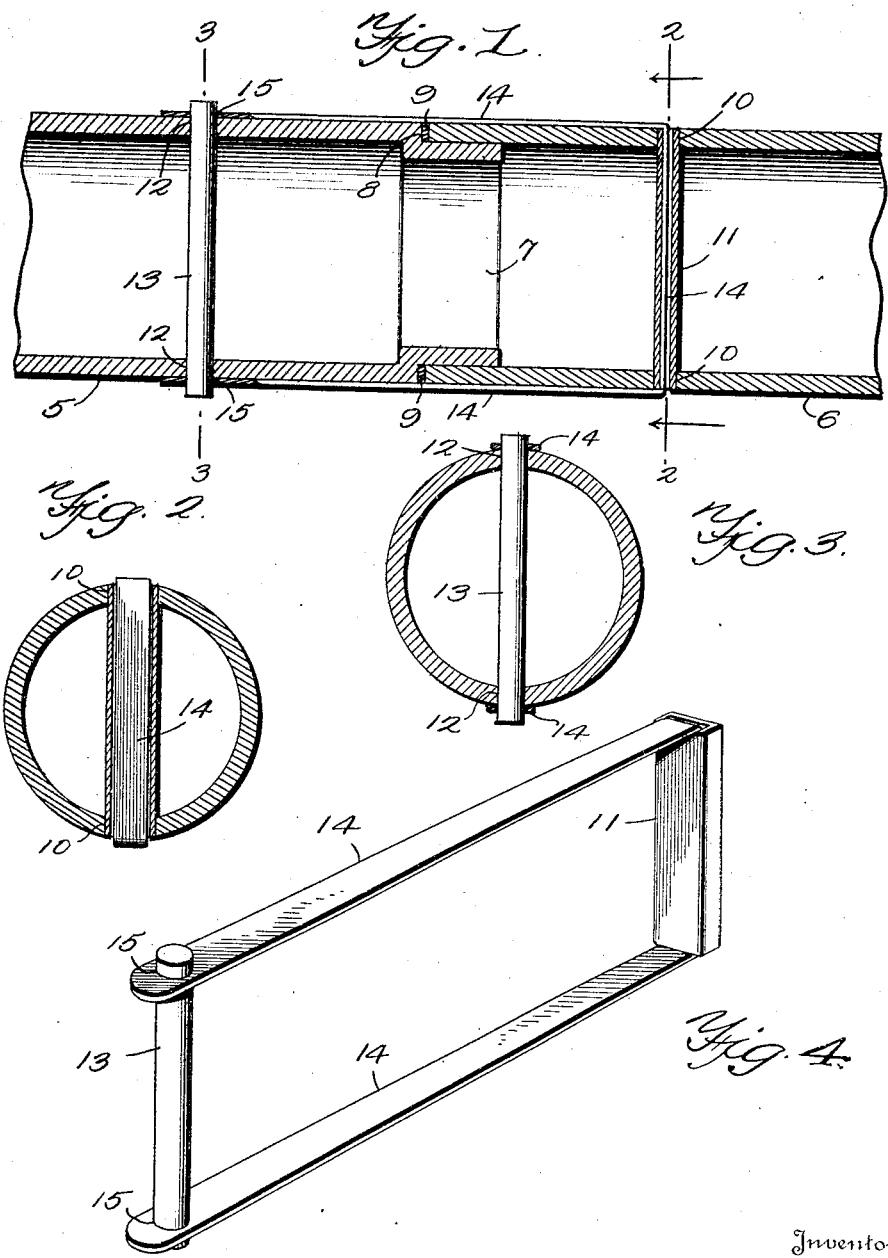

JAMES FILLIS, OF WILMINGTON, DELAWARE.

PIPE-COUPLING.

1,354,815. Specification of Letters Patent. Patented Oct. 5, 1920.

Application filed August 16, 1920. Serial No. 403,670.

*To all whom it may concern:*

Be it known that I, JAMES FILLIS, a subject of the King of Greece, residing at Wilmington, in the county of New Castle and State of Delaware, U. S. A., have invented certain new and useful Improvements in Pipe-Couplings, of which the following is a specification.

My invention relates to improvements in pipe couplings.

An important object of the invention is to provide a device of the above mentioned character, which is simple in construction, cheap to manufacture, and will enable the ends of pipes to be quickly and conveniently connected and separated.

A further object of the invention is to provide a device of the above mentioned character, which may be applied to, or installed upon ordinary pipes, having interfitting ends.

Other objects and advantages of the invention will be apparent during the course of the following description.

In the accompanying drawings forming a part of this specification, and in which like numerals are employed to designate like parts throughout the same, Figure 1 is a central longitudinal sectional view through a device embodying my invention, Fig. 2 is a transverse section taken on line 2—2 of Fig. 1, Fig. 3 is a similar view taken on line 3—3 of Fig. 1, and, Fig. 4 is a perspective view of the holding device.

In the drawings, wherein for the purpose of illustration is shown a preferred embodiment of my invention, the numerals 5 and 6 designate pipes or conduits, pipe 5 having a reduced extension 7, forming shoulders 8. The reduced extension 7 projects into the pipe 6. Packing 9, of rubber or the like, is arranged between the end of the pipe 6 and shoulder 8.

The pipe 6 is provided with a pair of diametrically arranged openings 10, receiving a diametrically extending tube 11, the ends of which fit tightly within the openings 10, forming a water tight joint. The pipe 5 has diametrically arranged openings 12, receiving a diametrically extending pin 13, fitting snugly within the openings 12 to form a water tight joint therewith.

The numeral 14 designates a flexible element, which is preferably in the form of a flat metallic band or strip, adapted to be inserted through the tube 11, which is preferably flat, and to be bodily removed upon the tube, when desired. The ends of the strap 14 have apertures 15, to receive the ends of the pin 13. The invention is not restricted to the use of a flat flexible element, as the shape may be varied.

In the use of the device, the ends of the pipes are assembled, and the flexible element 14 passed through the tube 11, and while the ends are drawn together by any suitable means, which would compress the packing 9, the apertures 15 are caused to receive the pin 13. If desired, the ends of this pin may be flattened or spread. It is obvious that the elements 11 and 13 may be secured to the pipes, during their manufacture and shipped with them, or that the pipes may be provided with the openings 10 and 12, and the elements placed therein subsequent to the shipment of the pipes. The elements of the holding device, are all readily separable and adapted to be folded flat for shipment, with an economy in space.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:—

1. The combination with a pair of pipes having engaging ends, said pipes being provided with pairs of openings, a tube held within the openings of one pipe, a pin extending through the openings of the other pipe and projecting exteriorly thereof, and a flexible element extending through the tube and having its ends engaging the ends of the pin.

2. The combination with a pair of pipes having engaging ends, said pipes being provided with pairs of openings, a tube held within the openings of one pipe, a pin extending through the openings of the other pipe and projecting through the exterior thereof, and a flexible band extending through the tube and having its ends apertured to receive the ends of the pin.

3. The combination with a pipe having diametrically oppositely arranged openings, of a tube held within said openings and forming a water tight joint therewith, a second pipe having a reduced extension to enter the first pipe and form a shoulder upon the second pipe, the second pipe having a pair of diametrically arranged openings, a pin extending through the openings of the second pipe and projecting through the exterior thereof, a flexible band extending through the tube and having its ends apertured to receive the ends of the pin, and packing arranged upon the shoulder.

4. The combination with a pair of pipes having engaging ends, one pipe being provided near its end with a pair of openings, a tube extending transversely within the pipe and having its ends held within said openings, a flexible element extending through the tube, and means to secure the ends of the flexible element to the other pipe.

In testimony whereof I affix my signature.

JAMES FILLIS.